(12) United States Patent
Vong et al.

(10) Patent No.: US 7,030,837 B1
(45) Date of Patent: Apr. 18, 2006

(54) AUXILIARY DISPLAY UNIT FOR A COMPUTER SYSTEM

(75) Inventors: William H. Vong, Seattle, WA (US); Steven T. Kaneko, Medina, WA (US); Kenneth R. Robertson, Redmond, WA (US); Kenneth V. Fry, Seattle, WA (US); Manolito E. Adan, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/556,982

(22) Filed: Apr. 24, 2000

(51) Int. Cl.
    *G09G 5/00* (2006.01)

(52) U.S. Cl. .................. 345/1.3; 345/3.1; 715/734

(58) Field of Classification Search ............ 345/3, 345/1.1, 2.3, 3.1, 502, 717, 2.1, 733, 749, 345/750, 751, 1.3, 2.2, 661, 660, 5; 709/232, 709/238, 216, 223, 224; 710/33; 713/201; 358/426.12; 708/104; 715/733, 734, 804
See application file for complete search history.

(56) References Cited

U.S. PATENT DOCUMENTS

| | | | |
|---|---|---|---|
| 5,208,745 A * | 5/1993 | Quentin et al. ............ 364/188 |
| 5,555,157 A | 9/1996 | Moller et al. |
| 5,727,155 A * | 3/1998 | Dawson ...................... 709/205 |
| 5,762,553 A * | 6/1998 | Takasugi et al. ............. 463/34 |
| 5,818,361 A | 10/1998 | Acevedo |
| 5,844,553 A | 12/1998 | Hao et al. |
| 5,933,822 A | 8/1999 | Braden-Harder et al. |
| 5,959,630 A * | 9/1999 | Takeuchi et al. ............ 345/835 |
| 5,999,169 A * | 12/1999 | Lee ............................ 345/163 |
| 6,112,141 A | 8/2000 | Briffe et al. |
| 6,112,215 A * | 8/2000 | Kaply ........................ 715/507 |
| 6,126,328 A | 10/2000 | Mallory et al. |
| 6,191,758 B1 * | 2/2001 | Lee ............................... 345/2 |
| 6,215,474 B1 | 4/2001 | Shah |
| 6,219,027 B1 * | 4/2001 | Shimizu et al. ............ 345/733 |
| 6,226,640 B1 | 5/2001 | Ostrovsky et al. |
| 6,317,141 B1 | 11/2001 | Pavley et al. |
| 6,337,698 B1 | 1/2002 | Keely, Jr. et al. |
| 6,341,305 B1 * | 1/2002 | Wolfe .......................... 709/203 |
| 6,381,519 B1 | 4/2002 | Snyder |
| 6,390,371 B1 | 5/2002 | Armga et al. |

(Continued)

FOREIGN PATENT DOCUMENTS

GB         2241474 A         9/1991

OTHER PUBLICATIONS

Toshiba Infinia 7130, Product Specifications and photographs of product, Toshiba American Information Systems Inc., Apr. 4, 2000.

(Continued)

*Primary Examiner*—Amr A. Awad
*Assistant Examiner*—Abbas I. Abdulselam
(74) *Attorney, Agent, or Firm*—Banner & Witcoff, Ltd.

(57) ABSTRACT

A host computer is provided with a main display unit and an auxiliary display unit. The host computer can free up screen space on the main display screen by routing certain types of display information to the auxiliary display unit for display. Display information can range from notification of events such as receipt of email, appointments, system messages, and information from separate applications. The auxiliary display panel may function as a user interface for audio, video, "push information", MP3 player or become the hardware equivalent of a multimedia player. The auxiliary display panel may be integrated together with the host computer in the same physical structure or may be part of a standalone display unit that is wired or wirelessly coupled to the host computer.

24 Claims, 6 Drawing Sheets

U.S. PATENT DOCUMENTS

| | | |
|---|---|---|
| 6,431,716 B1 | 8/2002 | Kusakabe |
| 6,438,282 B1 | 8/2002 | Takeda et al. |
| 6,438,619 B1 | 8/2002 | Coman |
| 6,446,111 B1 * | 9/2002 | Lowery ................ 709/203 |
| 6,504,575 B1 | 1/2003 | Ramirez et al. |
| 6,512,529 B1 | 1/2003 | Janssen et al. |
| 6,522,309 B1 * | 2/2003 | Weber ................ 345/1.1 |
| 6,661,435 B1 | 12/2003 | Nason et al. |
| 6,686,936 B1 | 2/2004 | Nason et al. |

OTHER PUBLICATIONS

Screen-print of Corel WordPerfect 8 Tools/Settings/Display dialogue box, © 1997.

Sony Vaio MX Desktop Entertainment, On-line Product Brochure for Models PCV-MX2L5, MX2TV7 and MX2V7, Sony Marketing (Japan) Inc., Copyright 2000 (printed Oct. 27, 2000 from http://www.sony.co.jp/ProductsPark/Consumer/PCOM/PCV-MX2).

* cited by examiner

AUXILIARY DISPLAY UNIT FOR A COMPUTER SYSTEM

I. BACKGROUND OF THE INVENTION

A. Technical Field

The disclosure generally relates to employing a secondary or auxiliary display unit in addition to a main or primary display unit in a computer system. More particularly, the disclosure relates to the use of an auxiliary display unit that can share display responsibility of a host computer with a main display.

B. Related Art

In computer systems today, a single monitor or other type of display unit is connected to a system bus via an interface, such as a video adapter. The system bus couples the monitor to the central processing unit (CPU) of the host computer. The host computer executes instructions requesting that information be retrieved from system memory and sent over the system bus to the display monitor for display.

One known system provides a computer network having a common CPU that can be shared among multiple display terminals and keyboards. In this system, the display terminals are dumb terminals under the control of the CPU. Such a system is typically set up for use by multiple independent users. The advantage of such a system is that the CPU can be centrally located out of sight and away from each of the user's terminals. Thus, space can be freed up at a user's workstation. Another advantage is that all the applications can be stored in a single location rather than having to be installed separately for each user. User display terminals in this type of system suffer the shortcomings discussed below.

Computer operating systems typically run multiple applications concurrently and also maintain multiple applications open. When multiple applications are active or open, various regions of the monitor's display screen provide information regarding or space dedicated to the active applications. For example, a task bar and status notification area typically occupy reserved sections of the display screen. Email and printer status/notification usually is represented as a small icon on the task bar. Also, multiple active applications, for example a spreadsheet application and a word processing application, may occupy different sections of the screen. A transient system message may pop up in a dialog box overlaying an active application. Additionally, if a user inserts a compact disc (CD) into a CD player coupled to the computer system, a separate soft user interface (UI) applet is launched on top of the active application(s) taking up more display space on the display screen. Typically, to recover the primary display screen real estate, the user immediately minimizes the applet window in order to continue working on an underlying active application such as a word processing application.

As is readily apparent from the above description of a typical computer system, substantial portions of the display screen may be occupied by other active applications, dialog boxes, task bars and the like cluttering the display screen and preventing the user from making the most of the display screen for an active application. For example, the user may not want the display screen to show status or notification information or share the display screen area with certain applications. For instance, the user may want to leave substantially all the display screen area for a particular application(s) with which he is working. Further, notifications and dialog boxes often can disrupt or distract a user attempting to focus on a specific application. Thus, there is a need to provide users with the ability to efficiently use and/or manage the display screen of the monitor while still being able to view the status of other applications and receive messages about other applications, without encroaching on the display screen area. The display terminals in the computer network described above are controlled independently. Consequently, one display terminal cannot help to alleviate the display real estate problems associated with a second terminal.

Another disadvantage with existing computer systems is that status/notification information cannot be viewed when the display monitor is off or in a screen saver mode, or when the host computer is off. A select few newer operating systems include "hibernate" or "sleep" modes where the host computer periodically wakes up and checks status, for example the computer may check whether an email has been received. Thus, the status/notification functionality is not always available to the user except in the few systems where the occurrence of an event (e.g., receipt of an email) wakes the system up to indicate the status. Typically in this instance, the system periodically provides an indication of notification/status to the user, thus not always providing the indication on the display monitor. Accordingly, there is a need to provide a system in which a user may be able to view status/notification information at all times irrespective of the power status of the main computer.

II. SUMMARY OF THE INVENTION

Aspects of the invention include providing an auxiliary or secondary display unit in a computer system in addition to a main or primary display unit in order to display certain information normally displayed by the main display unit.

The present invention is directed to one or more separate auxiliary display units for use in a computer system. According to one aspect of the invention, display information normally associated with a task bar or "system tray" in an operating system (OS) may be displayed on at least one auxiliary display unit rather than the main display unit. Alternatively, such display information may be displayed on the main display unit and at least one auxiliary display unit. Illustrative types of information displayed on an auxiliary display unit can include notifications of events, such as email events, printer events or calendar events, system messages such as dialog box notifications of system events, and date and time information such as a clock. Display information received from separate applications such as stock tickers, weather and traffic reports may also be directed to an auxiliary display unit.

In another aspect of the invention, the auxiliary display unit may be integrated to the host computer in a single structure. One of the advantages associated with this aspect is that by routing display information such as particular application display information and/or status/notification display information to the auxiliary display unit, valuable primary screen display real estate may be made available for use with an application run on the primary display screen. Thus, for example, "in your face" dialog boxes providing notification of events may be removed from the main display screen.

According to another aspect of the invention, the auxiliary display unit may be a separate stand-alone unit that the host computer controls by way of wireless or wired networks such as Ethernet, RF (radio frequency), IR (infrared) or power line carrier. An advantage of this implementation is that the user may be remote from the host computer and its main display unit, but may receive notification/status information by being located proximate to the auxiliary display unit.

In yet another aspect of the invention, the auxiliary display unit may include an LCD (liquid crystal display), LED (light emitting diode) or EL (electroluminescent) display panel or a monitor type display of any size from a miniature size monitor substantially smaller than the main display monitor to a TV size monitor larger than the main display monitor. An auxiliary display unit may be dedicated to a single functionality such as only displaying notification of an email or it may display multiple functionality.

According to one aspect of the invention, the auxiliary display unit may be scaled to provide a richer user interface (UI) based on the display characteristics. An illustrative UI can range from simple LED notification, text-to-speech of email messages to a full UI with a touch panel interface and graphics picture frame. That is, the UI for the auxiliary display unit may include an LCD (liquid crystal display), LED (light emitting diode) or EL (electro-luminescent) display panel or a monitor type display of any size from a miniature size monitor substantially smaller than the main display monitor to a TV size monitor larger than the main display monitor. Also, the auxiliary display unit may function as a UI for Internet radio, video, "push information", MP3 player, or become the hardware equivalent of a multimedia player. Further, the auxiliary display unit can be the display for applications such as a jukebox, boombox, stock ticker, electronic picture frame, etc.

These and other novel advantages, details, embodiments, features and objects of the present invention will be apparent to those skilled in the art from following the detailed description of the invention, the attached claims and accompanying drawings, listed herein, which are useful in explaining the invention.

III. BRIEF DESCRIPTION OF DRAWINGS

Figure 5A:
Figure 5B:
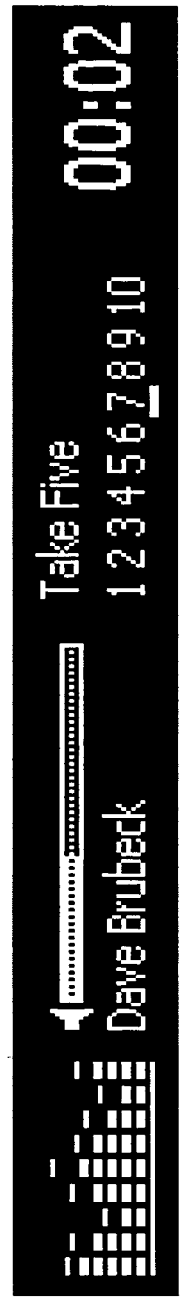
Figure 5C:
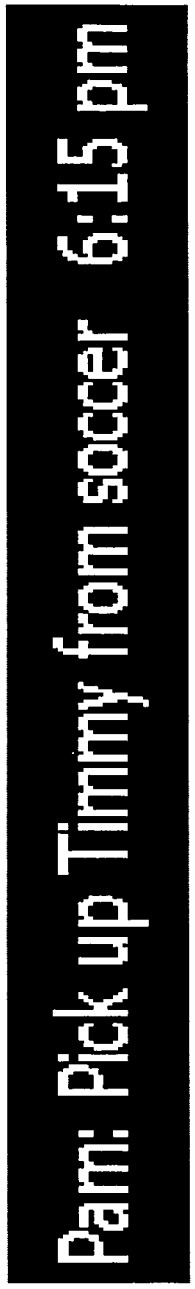

FIGS. 5A–C show information depicted on illustrative auxiliary display panels according to embodiments of the present invention.

Figure 6:
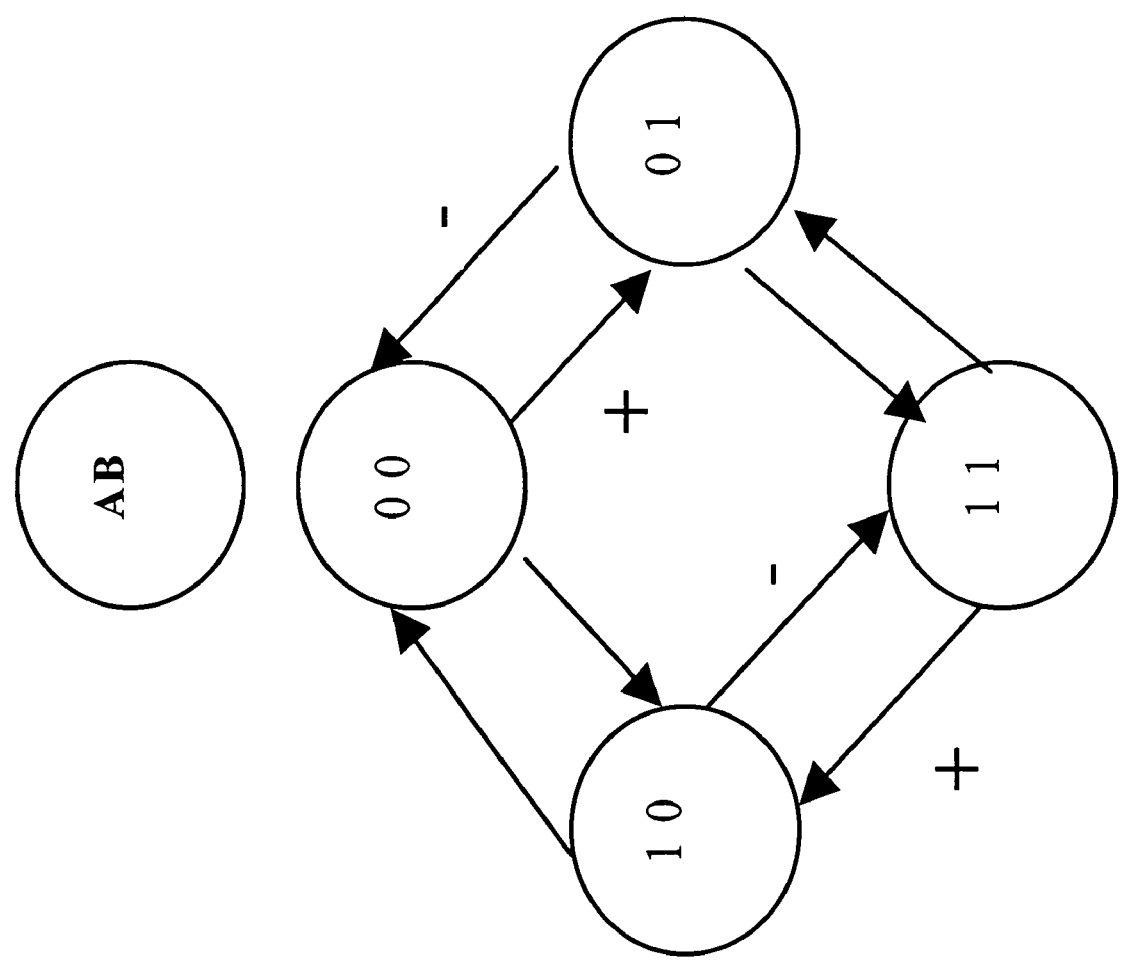

FIG. 6 shows an illustrative state diagram for a motion conversion in accordance with an illustrative embodiment of the present invention.

IV. DETAILED DESCRIPTION

The present invention relates to a computer system having a main display unit and an auxiliary display unit controlled by a host computer for displaying status/notification information, applications, system messages, and the like.

Although not required, portions of the invention may be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. An auxiliary display unit according to the present invention may also be practiced with personal computers (PCs), hand-held devices, multiprocessor systems, microprocessor-based or programmable consumer electronics, network PCs, minicomputers, mainframe computers, and the like.

Figure 1:
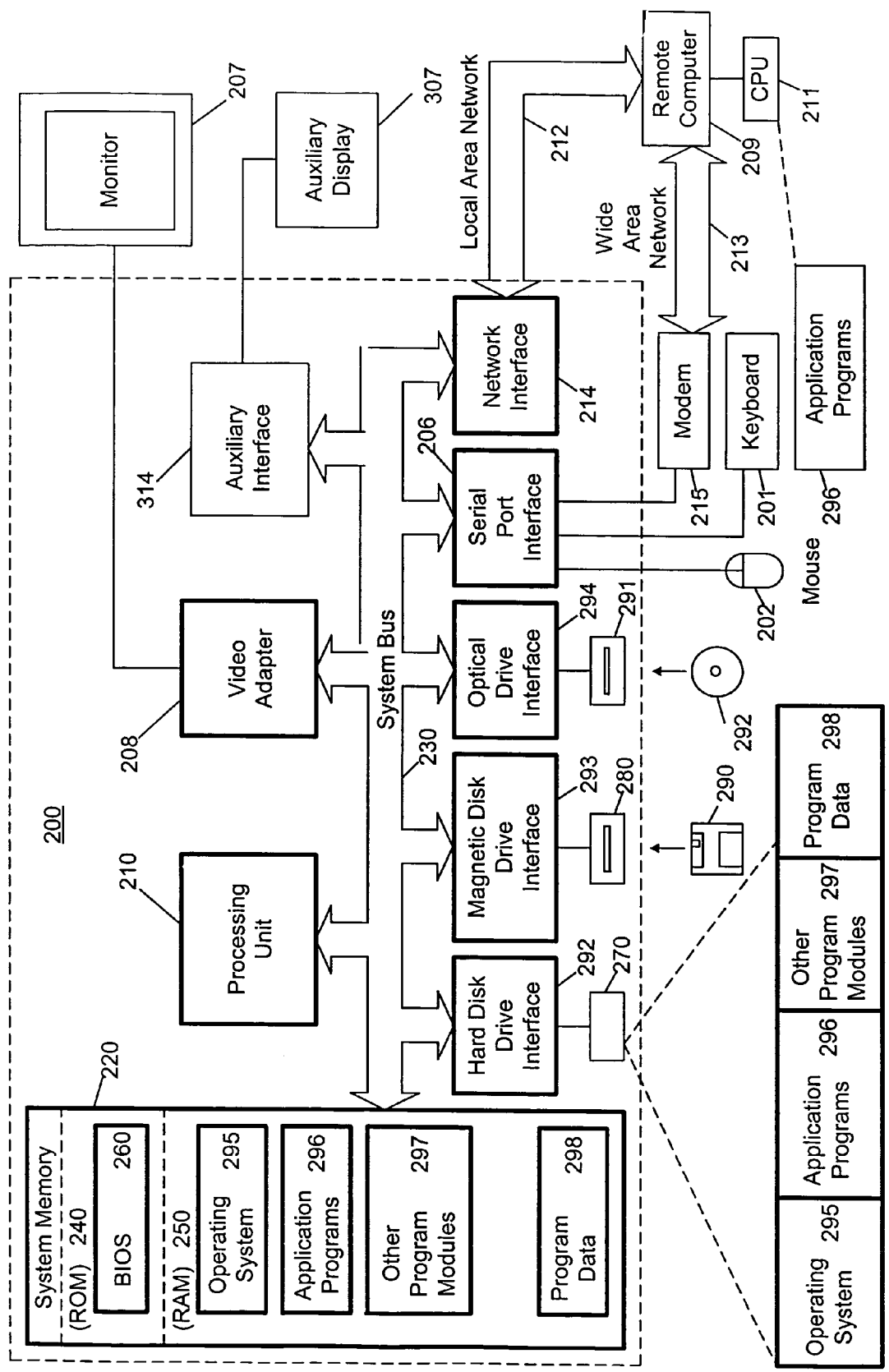
FIG. 1 shows a general purpose computer system that may be used with an auxiliary display unit in accordance with embodiments of the present invention.

FIG. 1 is a schematic diagram of a computing environment with which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB).

A monitor 207 or other type of main display unit is also connected to the system bus 230 via an interface, such as a video adapter 208. Also, coupled to the system bus 230 is an auxiliary display unit 307 via an auxiliary interface 314. In addition to the main and auxiliary display units, personal computers typically include other peripheral output devices (not shown), such as speakers and printers.

The auxiliary interface 314 can couple the processing unit 210 to the auxiliary display unit 307 in various ways. It should be understood that the terms "couple," "coupling", "coupled" and grammatical variations thereof as used herein mean all known wired and wireless connections. Interfaces between the auxiliary display unit 307 and the personal computer 200 include, but are not limited to, an expansion card, standard communication interfaces such as serial, parallel, 1394, or USB (universal serial bus) connectors, IR, Ethernet, RF or Power Line Carrier.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Figure 2:
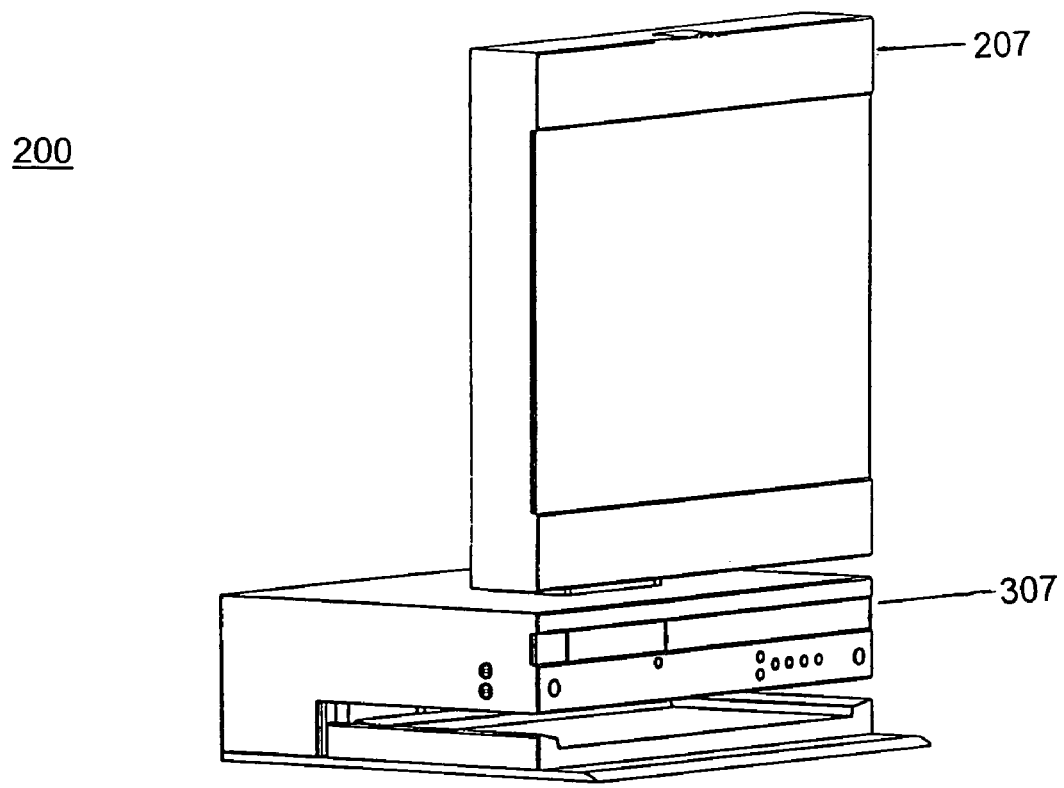
FIG. 2 shows the physical structure of an in illustrative computer system according to embodiments of the present invention.

FIG. 2 shows the physical structure of an in illustrative computer system according to embodiments of the present invention. In FIG. 2, a personal computer (PC) is physically integrated with a main display unit or monitor 207 and an auxiliary display unit or display panel 307. Thus, the PC, main display unit 207 and auxiliary display unit 307 are shown as part of the same physical structure. As described further herein, the auxiliary display unit 307 may be a standalone display.

Figure 3:
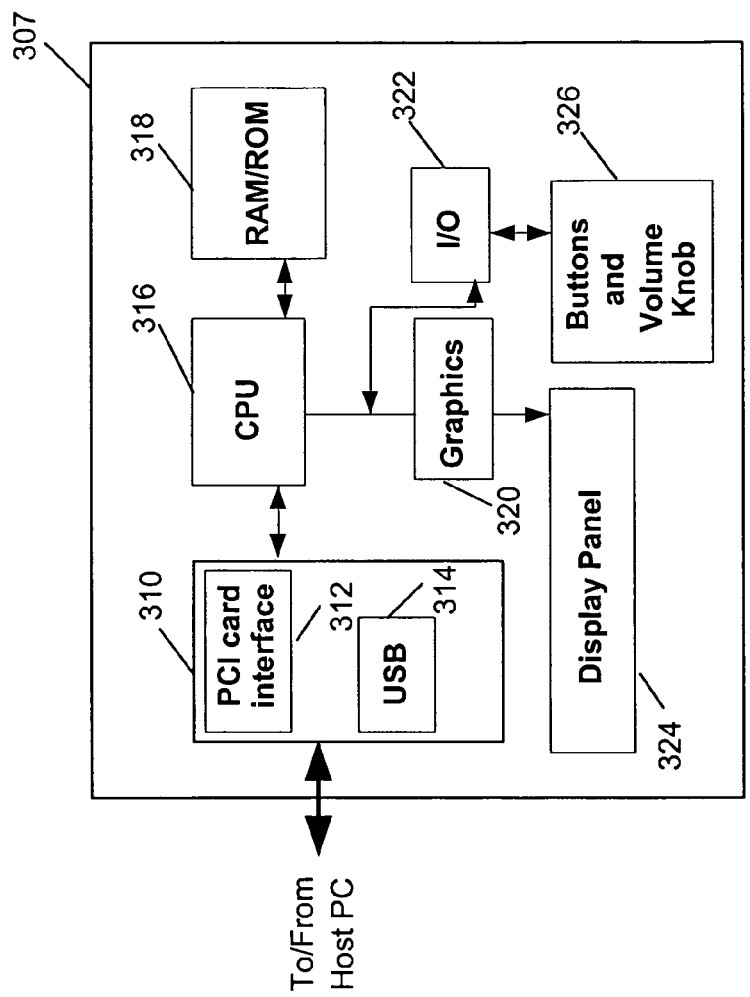
FIG. 3 shows a block diagram of an auxiliary display unit according to an illustrative embodiment of the present invention.

According to embodiments of the present invention, the auxiliary display unit 307 may display information under the control of the PC. FIG. 3 depicts a block diagram of the auxiliary display unit 307 according to an illustrative embodiment of the present invention. The host PC auxiliary interface may be a standard communication or card interface for communicating with the auxiliary display unit 307. The host PC auxiliary interface can be adapted for an expansion card and standard communication interfaces known in the art such as serial, parallel, 1394, or USB, IR, Ethernet, RF or Power Line Carrier.

In the illustrative embodiment of FIG. 3, the auxiliary display unit includes an interface 310 including a PCI card interface 312 and a USB interface 314 for communicating with the host PC. The interface 310 is coupled to a CPU 316. The CPU 316 is coupled to local memory such as RAM/ROM 318. The CPU 316 receives the commands through the interface 310 from the host PC and interacts with local memory, e.g., RAM/ROM 318 as necessary and causes the appropriate commands to be directed to a graphics module 320 which in turn generates an appropriate display to be shown on the display panel 324. Also, the CPU 316 is coupled to an I/O module 322, which can receive user input through buttons and volume knob 326, such as by way of a user turning the volume knob or actuating one of the buttons. The CPU 316 may output information through the I/O module 322. For example, audio may be output or a button may be illuminated. It should be understood that buttons and volume knobs are illustrative input/output devices and that the present invention is not so limited. For example, the I/O module 322 and graphics module 320 may both be connected to the display panel 324, where inputs may be received by way of a touch screen. Further, I/O module 322 may be connected to a microphone, speakers, an IR (infrared) sensor device which can identify a user, a camera, keypad, etc.

Figure 4:
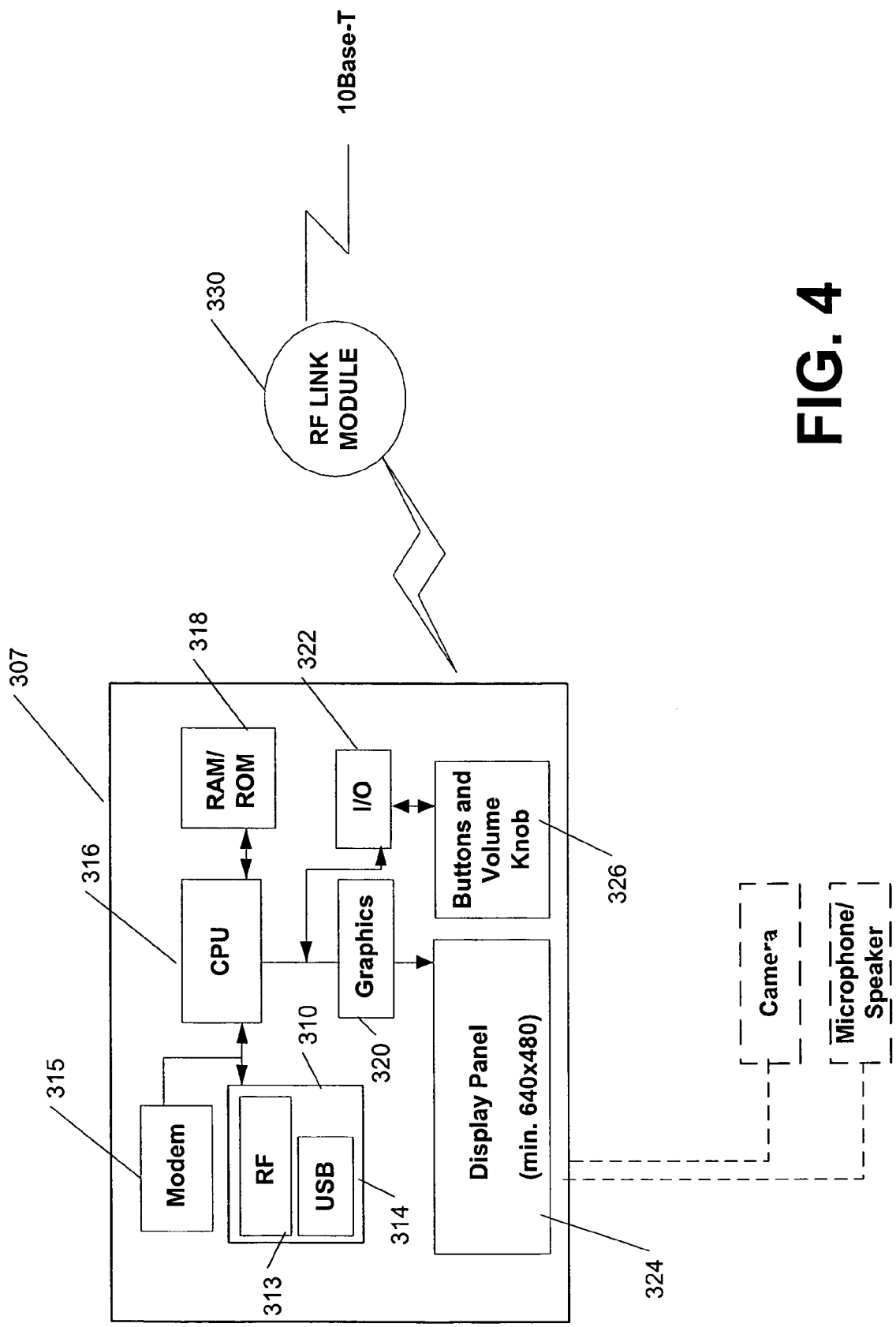
FIG. 4 shows a block diagram of an auxiliary display unit according to another illustrative embodiment of the present invention.

FIG. 4 shows another illustrative implementation of an auxiliary display unit according to an embodiment the present invention. Elements in FIG. 4 that are the same as elements in FIG. 3 have been labeled with the same reference numerals. In FIG. 4 the host computer includes an RF link module 330 for interfacing with the auxiliary display unit 307, and in particular with the RF interface 313, which forms part of the interface 310. In contrast to FIG. 2 and in accordance with FIG. 4, the host computer and the auxiliary display unit are not physically attached to each other.

The RF link module 330 may be coupled to a server by way of a standard wired connection, such as 10Base-T or 100Base-T. When coupled to a server, the host computer may be one of plural host computers coupled to a server. Alternatively, the RF link module 330 may be external to the host computer, and within broadcast range of the RF interface 313 of the auxiliary display unit 307. In this arrangement, a standard wired connection, such as 10Base-T or 100Base-T, can be used to provide signaling between the RF link module 330 and the host computer.

In embodiments of the invention where multiple auxiliary display units (either fixed or mobile) are coupled to the host computer and spread out over a wide area (e.g., in a home or office environment), various RF link modules can better facilitate communication between the host computer and auxiliary display units. In a home environment, individual rooms or areas around a house may have a dedicated RF link module 330 for uploading and downloading information (e.g., audio, video, multimedia, data, etc.) between the host computer and each auxiliary display unit. This may be particularly beneficial in areas such as a kitchen or living room where multiple auxiliary display units may exist. Auxiliary display units may be implemented in many devices including, but not restricted to, various kitchen appliances, communication devices (e.g., cable, satellite, and Internet televisions, satellite or Internet radios, and mobile and landline communication units), security systems, electronic game equipment, electronic picture frame, web companions and Internet appliances. These devices may be fixed or some may be used portably such as a wristwatch or handheld Internet appliance. Further, many elements may be coupled to the I/O module 322 of the auxiliary display unit including, but not limited to, a camera and motion sensor (e.g., for a security system), Internet appliances, electronic game equipment, wireless (e.g., IR and RF) remote control devices (e.g., for an MP3 player, CD player, Internet appliance, radio, television, electronic game equipment, VCR, etc.).

Also, the embodiment of FIG. 4 can include other features than shown in the FIG. 3 embodiment. For example, a camera and microphone/speaker are shown coupled to the auxiliary display unit for receiving audio and video input and generating audio and video output. The display panel 324 may have a resolution of 640×480 pixels. Further, an auxiliary display unit according to the invention, such as FIG. 4, may be configured to have a touch screen display, a video camera-intercom system, email notification on the display panel in the form of video or text or output by a speaker for voice. The display panel may be a display dedicated for or adapted to display information for an MP3, DVD, CD player, or electronic picture frame coupled directly to the auxiliary display unit 307 or the host computer 200. The display panel may adapted for multiple types of information included, but not limited to, calendar information, number of voice mail messages, number of email messages, time-of-day, and information regarding a multimedia player. Illustrative display panels containing multiple types of information are depicted in FIGS. 5A–C.

In addition as shown in the FIG. 4 embodiment, a modem 315 (e.g., 56k) may be coupled to the auxiliary display unit CPU 316 and the interface 310. Responsive to a command received from the host computer 200 or the CPU 316, the modem 315 can connect the auxiliary display unit 307 to the Internet or other data communication networks without having to route the information through the host computer 200. This implementation may be particularly beneficial when multiple Internet connections (e.g., phone lines, DSL, cable-modem, ISDN) are accessible. That is, a user of the auxiliary display unit 307 may not have to share bandwidth with a user of the main display monitor who accesses the Internet via the host computer 200. The host computer 200 can send commands to the auxiliary display unit 307 to initiate its own connection to the Internet. Also, the auxiliary display unit 307 may be separately addressable and capable of receiving information directly from the Internet such as "push" type data including stock ticker information, sports scores, news, etc.

The auxiliary display unit 307 may be set to receive display information that may have been part of the domain of the main display unit 207 in conventional computer system environments. For example, the responsibility for displaying information regarding separate applications (e.g., stock tickers, weather reports, and traffic reports) may be assigned to the auxiliary display unit 307. Also, the auxiliary display unit 307 could receive display information normally associated with the task bar, system messages and notification of events (e.g., time, power status, email and messaging notification, printer information, volume control, dialog box notifications of system events etc.) on the main display unit 207. In an illustrative embodiment, the auxiliary display unit 307 may receive display information for a "system tray" in an OS such as Win9x/NT™ from Microsoft® Corporation of Redmond, Wash. According to another illustrative embodiment, the display panel of the auxiliary display unit can function as the UI for Internet radio and television, video, "push information", an MP3 player or even become the hardware equivalent of a Windows® media player distributed by Microsoft® Corporation. Depending upon the characteristics of the auxiliary display unit, it may be scaled to provide a UI for certain functionality that is richer than what may be available with the main display unit. The auxiliary display panel UI may span from simple LED notifications to text-to-speech conversion of incoming email messages, to a full UI with a touch panel interface and a graphics picture frame.

An auxiliary display unit may be responsible for a single or multiple applications, systems messages, notifications and the like. For example, an email, word processing or financial application may appear only on the display panel of the auxiliary display and not appear on the main display unit. Further, input from a user may be received from an input device coupled to the auxiliary display unit, the host computer or both. The host computer can be configured manually or dynamically to route display functionality to the auxiliary display unit. According to embodiments of the present invention, responsibility for an email application may be routed to one or more auxiliary display units by default. In an illustrative implementation of the present invention, if a user were to insert a CD into the host computer, the host computer is configured to launch a soft UI applet and route the UI applet for display on the display panel of the auxiliary display unit rather than the display screen of the main display unit.

In a dynamic implementation the host computer may first detect whether a compatible auxiliary display unit is coupled thereto is available to handle particular display functionality. Upon detection of the availability of a compatible auxiliary display unit, the computer can route the functionality to the particular auxiliary display unit and in some embodiments the main display unit. In the event no compatible auxiliary display unit is available, the host computer can route the display functionality to the main display unit.

The host computer can maintain in memory a list of functionality assigned to particular auxiliary display units or module. By checking the memory, the host computer can intelligently control the various functionality routed to an auxiliary display unit to avoid overloading display responsibility at that unit. Alternatively, the host computer may change display functionality responsibility among auxiliary display units connected to the host computer. Further, the host computer can swap or share functionality among the main display unit and one or more auxiliary display units. Further, different (less or more) display information concerning a launched application may be displayed on the main unit then is displayed on an auxiliary display unit. This can occur when display information for an active application is being simultaneously displayed on the main display unit and an auxiliary display unit. Similarly, information displayed regarding an active application can vary from one auxiliary display unit to the next. Also, responsive to a user input at the host computer or at an auxiliary display unit, or automatically upon detection of event, information displayed on a first display (main or auxiliary) may be displayed on a second display (main or auxiliary) and the display of the information on the first can continue or discontinue.

To manually control allocation of functionality to auxiliary display units, the user may modify the default settings in the operating system of the host computer by inputting appropriate assignments and defining the types and amount of functionality for which an auxiliary display unit is responsible. Preferably, the host computer will be able to detect the presence of each auxiliary display unit attached thereto by, for example, periodically sending out a polling command for example, by way of the auxiliary interface 314. According to other embodiments, the host computer may have to be informed when a new auxiliary display unit is coupled thereto by way of an input received from the auxiliary display unit or a user.

It should be understood that although the host computer routes certain display functionality to a display unit, the main display unit of the host computer might simultaneously handle that display functionality as well. This allows information to be displayed and possibly acted on at various locations. For example, in a home environment, notification of email messages may be displayed on auxiliary display units in different rooms and on the main display unit of the host computer. Further, it may be that none, some or all of the auxiliary display units that display a notification actually are configured or authorized to allow a user to change a variable associated with the email application (e.g., number of waiting messages) and access the email message by way of an input device associated with the particular auxiliary display unit. In one embodiment, an auxiliary display unit may include a user password or recognition mechanism to determine whether a particular user can change a variable associated with a launched application or initiate the launching of an application (e.g., to view email messages on the auxiliary display panel) by way of an input to a device associated with the auxiliary display unit. This would limit the ability of an unintended recipient to access a message. Such recognition devices may include common security applications such as voice recognition, face recognition, finger print id, etc.

According to an embodiment of the present invention, when the main display is in a screensaver or off mode or the host computer is not on or in a hibernate mode, sufficient hardware and software functionality can be provided in the auxiliary display unit to allow the auxiliary display unit to bypass the host computer and connect directly to the server (Internet or local) to operate autonomously, that is perform a specific application such as checking email status. Such a mode of operation can function with external cameras. For example, if a doorbell rings, the user can view who is at the door with a stand-alone auxiliary display unit capable of displaying video images (still and moving). Further, such a standalone auxiliary display unit may also display JPEG or other image formats and function as an electronic picture frame.

An illustrative implementation of the auxiliary display unit communications with the host computer will now be described. To control the auxiliary display unit or module, the host computer CPU may communicate with a PIC (programmable integrated circuit) micro-controller chip located in the auxiliary display unit. Locating a micro-controller chip in the auxiliary display unit provides the ability to offload any processing overhead from the host computer. If a separate micro-controller is not used, then direct control of the auxiliary display panel and buttons will be the responsibility of the host computer CPU.

In this embodiment the micro-chip controller may support several functions including six momentary push-button switches; volume control; message notification light; IR blaster; hibernate mode/power mode LED (red/green states); and a motion sensor. Commands for controlling these functions and to report various states may be received and transmitted by way of a serial RS232 connector. The baud rate may be 57.6 Kbaud and the data format may be 8 bits, 1 STOP, no parity. It should be understood that computers might communicate with one another in a number of ways. While the implementation described herein includes a serial interface, other exemplary methods of interfacing could be via shared memory, using command blocks, or via USB protocols as a HID device. Firmware may be provided in the auxiliary display unit to respond to commands from the host computer.

Commands can be 8 bit opcodes that are encoded as follows:

<u>7</u> <u>6</u> <u>5</u> <u>4</u> <u>3</u> <u>2</u> <u>1</u> <u>0</u> c c c c n n n n—where cccc is a 4-bit op-code, and nnnn is the number of bytes following the command.

According to this embodiment, the acknowledge command ACK is 0xAA, and the not acknowledge command is NACK is 00. If the host computer receives a NACK, the host has the option of re-transmitting. If the auxiliary display unit or module receives a NACK, the module has the option of re-transmitting also.

Below, an illustrative Host to Module Protocol and Module to Host Event Protocol are shown.

HOST TO MODULE PROTOCOL

| Command (opcode,#Bytes) | Data | Response to Host | Function |
| --- | --- | --- | --- |
| 0xF0 | None | 0xAA | Reset |
| 0x11 | 0x00 | 0xAA | Reset Notification Light |
| 0x11 | 0x01 | 0xAA | Set Notification Light |
| 0x21 | 0x00 | 0xAA | Reset Hibernate LED (red) |
| 0x21 | 0x01 | 0xAA | Set Hibernate LED (red) |
| 0x31 | 0x00 | 0xAA | Send IR code Volume Up |
| 0x31 | 0x01 | 0xAA | Send IR code Volume Down |
| 0x31 | 0x02 | 0xAA | Send IR code Select Display |
| 0x31 | 0x03 | 0xAA | Send IR code Select CD |
| 0x31 | 0x04 | 0xAA | Send IR code Select Aux |
| 0x31 | 0x05 | 0xAA | Send IR code Select Sound |
| 0x31 | 0x06 | 0xAA | Send IR code Standby/On |
| 0x31 | 0x07 | 0xAA | Send IR code Scroll Left |
| 0x31 | 0x08 | 0xAA | Send IR code Scroll Right |

MODULE TO HOST EVENT PROTOCOL

| Event Command (opcode, #Bytes) | Data | Response from Host | Function |
| --- | --- | --- | --- |
| 0xE0 | None | 0xAA | Module is "Alive" |
| 0x81 | "nn" | 0xAA | Push button state change. Second byte is the status of each button with bit 0 = button 0, . . . bit 7 = button 7. Button assignments are as follows: Button 0: Scroll Up Button 1: Scroll Down Button 2: Display Button 3: CD Button 4: Aux Button 5: Sound Button 6: Hibernate |
| 0x91 | "count" | 0xAA | Volume motion. The second byte is a 2's complement of the number of counts from encoder. |
| 0xA0 | None | 0xAA | Motion pulse detected |

The module will periodically send an "I am alive" event to the host to indicate that all is ok. The host responds with an ACK.

An illustrative Volume Control Encoder may be implemented using a Section 25L Mechanical Encoder from Grayhill, model 25LB-10Q. An exemplary state table for motion conversion is show in FIG. 6. Data is sampled on rising edge of the "B" input. An illustrative motion detector may be a passive infrared detector, such as a 3-pin sensor module. 3-pin sensor modules are readily available. A typical 3-pin sensor module would generate a positive pulse output of approximately 1-second duration when motion is detected.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A personal computer system comprising:
   a personal computer;
   a main display unit coupled to said personal computer, said main display unit configured to receive first information associated with a first application launched by said personal computer and display the first information;
   an auxiliary display unit coupled to said personal computer and distinct from said main display unit, said auxiliary display unit configured to receive second information associated with a second application launched by said personal computer, said auxiliary display unit including
   a display for displaying the second information, and
   an input user interface dedicated to said auxiliary display unit and configured to receive inputs allowing user interaction with the second application in response to the second information being displayed on said display; and
   a second auxiliary display unit coupled to said personal computer and distinct from said main display unit and said auxiliary display unit, said second auxiliary display unit configured to receive third information from a third application launched by said personal computer and display the third information,
   wherein said personal computer is configured to dynamically control which information said second auxiliary display unit receives by determining whether said second auxiliary display unit is capable of providing display functionality for the information.

2. The personal computer system according to claim 1, wherein said personal computer, said main display unit and said auxiliary display unit are integrated together in a single physical structure.

3. The personal computer system according to claim 1, wherein said main display unit and said auxiliary display unit are not physically attached to each other.

4. The personal computer system according to claim 1, further comprising a wireless interface for coupling said auxiliary display unit to said personal computer.

5. The personal computer system according to claim 1, wherein said input user interface is configured to receive an input to change a variable associated with the second application.

6. The personal computer system according to claim 1, wherein said main display unit includes a display, the display of said auxiliary display unit being larger than the display of said main display unit.

7. The personal computer system according to claim 1, wherein the display of said auxiliary display unit is an electro-luminescent panel.

8. The personal computer system according to claim 1, wherein the second application is a messaging application.

9. The personal computer system according to claim 1, wherein said input user interface of said auxiliary display unit includes features not available with an input user interface associated with said main display unit.

10. The personal computer system according to claim 1, wherein said second auxiliary display unit is further configured to receive the first information and/or the second information.

11. The personal computer system according to claim 1, wherein said personal computer is configured to determine whether said second auxiliary display unit has sufficient display space available to receive the first or second information.

12. The personal computer system according to claim 1, wherein said personal computer is configured to determine whether a user of said second auxiliary display unit is authorized to receive the first or second information.

13. The personal computer system according to claim 1, wherein said auxiliary display unit only receives and displays information associated with the second application.

14. The personal computer system according to claim 1, wherein said input user interface is configured to receive user authorization information from a user, the user authorization information being processed to determine whether the user is authorized to change a variable associated with the second application.

15. The personal computer system according to claim 1, wherein said input user interface is configured to receive user authorization information from a user, the user authorization information being processed to determine a level of interaction with the second application for which the user is authorized.

16. The personal computer system according to claim 15, wherein the second application is a messaging application and the level of interaction includes viewing messages.

17. The personal computer system according to claim 1, wherein the second application is a messaging application and one of the inputs is a request to access a message.

18. The personal computer system according to claim 1, wherein the second information includes a graphical user interface associated with the second application.

19. The personal computer system according to claim 18, wherein the second application is an audio, video or multimedia player application, and said input user interface is configured to receive inputs for controlling aspects of the second application represented in the graphical user interface.

20. The personal computer system according to claim 1, wherein said auxiliary display unit is physically remote from said main display unit.

21. The personal computer system according to claim 20, wherein only one of said auxiliary display unit and said main display unit can be seen by a single user at a single moment in time due to the physical proximity of said main display unit and said auxiliary display unit.

22. The personal computer system according to claim 1, wherein the auxiliary display unit is portable.

23. The personal computer system according to claim 22, where the auxiliary display unit is physically attachable to a user.

24. The method of claim 1, wherein said auxiliary display unit is a standalone unit including the display and the input user interface.

* * * * *